United States Patent

Iso et al.

[11] Patent Number: 6,058,132
[45] Date of Patent: May 2, 2000

[54] LASER BEAM MACHINING APPARATUS USING A PLURALITY OF GALVANOSCANNERS

[75] Inventors: Keiji Iso; Takashi Kuwabara, both of Hiratsuka, Japan

[73] Assignee: Sumitomo Heavy Industries, Ltd., Tokyo, Japan

[21] Appl. No.: 09/021,377

[22] Filed: Feb. 10, 1998

[30] Foreign Application Priority Data

May 15, 1997 [JP] Japan .................................. 9-125422

[51] Int. Cl.⁷ ............................. H01S 3/08; B23K 26/00
[52] U.S. Cl. ............................. 372/108; 372/9; 372/15; 372/107; 372/104; 372/99; 219/121.6; 219/121.61; 219/121.74
[58] Field of Search ............................. 372/9, 10, 15, 372/24, 107, 108, 109, 99; 219/121.6, 121.61, 121.74, 121.76, 121.77

[56] References Cited

U.S. PATENT DOCUMENTS

| | | |
|---|---|---|
| 4,015,100 | 3/1977 | Gnanamuthu et al. ........ 219/121.61 X |
| 4,547,038 | 10/1985 | Mori ..................................... 219/121.1 |
| 4,701,591 | 10/1987 | Masaki et al. ................. 219/121.61 X |
| 5,055,653 | 10/1991 | Funami et al. ..................... 219/121.75 |
| 5,204,987 | 4/1993 | Klingel ................................. 219/121.6 |
| 5,229,569 | 7/1993 | Miyauchi et al. ................... 219/121.6 |
| 5,378,582 | 1/1995 | Chan ................................ 219/121.6 X |
| 5,414,239 | 5/1995 | Terabayashi et al. ............. 219/121.73 |

Primary Examiner—Brian Healy
Attorney, Agent, or Firm—Burns, Doane, Swecker & Mathis, LLP

[57] ABSTRACT

In an optical path of a laser beam, a reflection mirror (11) is located to divide the laser beam into two split laser beams. By the use of the split laser beams, workpieces (17a, 17b) are simultaneously processed.

14 Claims, 8 Drawing Sheets

LASER BEAM MACHINING APPARATUS USING A PLURALITY OF GALVANOSCANNERS

BACKGROUND OF THE INVENTION

This invention relates to a laser beam machining apparatus and, in particular, to a laser beam machining apparatus adapted to form a fine via hole in a printed wiring board.

In recent years, a portable electronic apparatus such as a digital camera, a video camera, and a mobile telephone set becomes more and more compact in size and superior in function. As a consequence, a printed wiring board contained in the electronic apparatus is improved so as to increase the density of various components mounted thereon and to reduce the lead pitch. In order to cope with such improvement, a via hole formed in the printed wiring board is required to have a diameter not greater than 0.3 mm.

Heretofore, a boring operation to form the via hole in the printed wiring board is carried out by tool machining using an NC (Numerical Control) drill or light exposure machining (photovia technique). However, the NC drill can not form the via hole smaller than 0.2 mm and is often broken. On the other hand, the photovia technique can not form the via hole smaller than 0.15 mm and requires a high material cost for light exposure.

In order to solve the above-mentioned disadvantages, proposal has recently been made of a laser beam machining apparatus for boring the via hole in the printed wiring board by the use of a laser beam. The laser beam machining apparatus comprises a laser oscillator for producing a pulsed laser beam. The laser beam machining apparatus carries out the boring operation to a desired depth by adjusting the number of laser pulses per via hole or the laser energy per pulse. On the other hand, in order to obtain a desired diameter of the via hole, a mask is arranged in an optical path of the laser beam to define the diameter of the laser beam. By reducing the diameter of the laser beam with the mask, the diameter of the via hole is reduced.

Furthermore, machining by the laser beam gives no damage to a metal. Thus, the laser beam machining apparatus is advantageous in that the boring operation is performed without damaging a conductor pattern formed on the printed wiring board.

The laser oscillator typically comprises an excimer laser. However, the excimer laser has a relatively low working speed and therefore requires a high running cost because of its low etch rate (boring depth per pulse). In contrast, attention is directed to a TEA (Transversely Excited Atmospheric Pressure) $CO_2$ laser having a narrow pulse width, a high peak power, and a high energy density. If the laser beam machining apparatus uses the TEA $CO_2$ laser as the laser oscillator, the etch rate is as high as ten times or more as compared with the excimer laser. It is therefore possible to reduce the number of laser pulses required to form each via hole and to increase the working speed.

However, even if the above-mentioned TEA $CO_2$ laser is used, the working speed is restricted. It is therefore desired to achieve an improvement enabling reduction in working cost per via hole.

SUMMARY OF THE INVENTION

It is therefore an object of this invention to provide a laser beam machining apparatus capable of considerably increasing a working speed.

A laser beam machining apparatus according to this invention comprises a laser oscillator for producing a laser beam, beam splitter means for splitting the laser beam into a plurality of split laser beams, and a plurality of laser irradiating means for irradiating the split laser beams onto at least one object to be processed.

According to an aspect of this invention, a plurality of objects are processed by the plurality of split laser beams, respectively.

According to another aspect of this invention, a single object is processed simultaneously by the plurality of split laser beams.

DESCRIPTION OF PREFERRED EMBODIMENT

In this invention, attention is directed to the following. Specifically, a laser beam emitted from a laser oscillator typically has a square or a rectangular section with each side approximately equal to 10 mm. The laser beam is reduced in its sectional area by the use of a mask and thereafter irradiated onto an object to be processed. In other words, only a part of the laser beam produced by the laser oscillator is used for machining. In this invention, the laser beam from the laser oscillator is divided into a plurality of split laser beams without decreasing its peak power or energy density. The split laser beams are used for laser machining of a plurality of objects or for simultaneous laser machining of a single object. As a result, a working speed can be increased.

Figure 1:
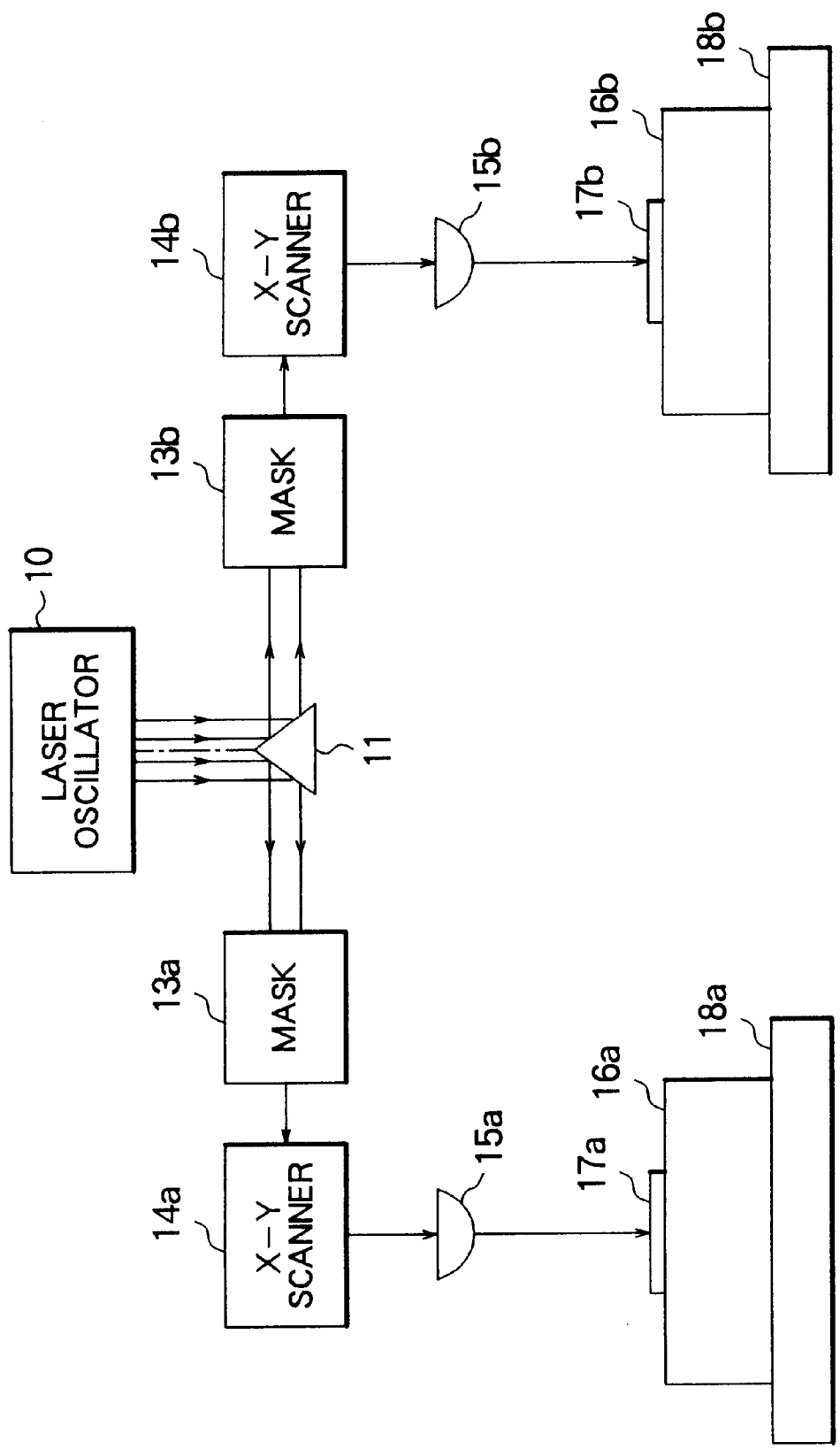
FIG. 1 is a block diagram showing the structure of a laser beam machining apparatus according to a first embodiment of this invention.

Referring to FIG. 1, description will be made about a laser machining apparatus according to a first embodiment of this invention. In FIG. 1, a laser oscillator 10 in this embodiment comprises a TEA $CO_2$ laser. A pulsed laser beam produced by the laser oscillator 10 is supplied to a reflection mirror 11 as a beam splitter and divided in its sectional area into two split laser beams. The split laser beams are deflected by 90° in opposite directions to be led to masks 13a and 13b (may simply be depicted at 13), respectively. As will later be described in detail, each of the masks 13a and 13b has at least one aperture for defining a diameter of a via hole to be formed. The split laser beams are reduced in diameter through the apertures in the masks 13a and 13b. The split laser beams passing through the masks 13a and 13b are led to X-Y scanners 14a and 14b, respectively.

As will later be described in detail, each of the X-Y scanners 14a and 14b is for making each split laser beam scan over an object to be processed. One of the split laser beams from the X-Y scanner 14a passes through a processing lens 15a and is irradiated onto a workpiece 17a placed on a workstage 16a. Likewise, the other split laser beam from the X-Y scanner 14b passes through another processing lens 15b and is irradiated onto another workpiece 17b placed on another workstage 16b. As well known, each of the processing lenses 15a and 15b is a laser beam focusing lens which may be called an fθ lens. Practically, each of the processing lenses 15a and 15b is a combination of a plurality of convex and concave lenses and is accommodated in a cylindrical housing. Such a combination is called an fθ lens assembly. For convenience of illustration, the fθ lens assembly is represented by a single processing lens. A combination of the fθ lens assembly and the X-Y scanner may be called a laser irradiation unit. Each of the workpieces 17a and 17b as the object to be processed is, for example, a printed wiring board.

The workstage 16a is driven by a stage drive mechanism 18a having an X-axis drive mechanism and a Y-axis drive mechanism and is movable on an X-Y plane. Thus, the workpiece 17a can be moved on the X-Y plane to be adjusted in position. Likewise, the workstage 16b is driven by a stage drive mechanism 18b having an X-axis drive mechanism and a Y-axis drive mechanism and is movable on an X-Y plane. Thus, the workpiece 17b can be moved on the X-Y plane to be adjusted in position.

Figure 2:
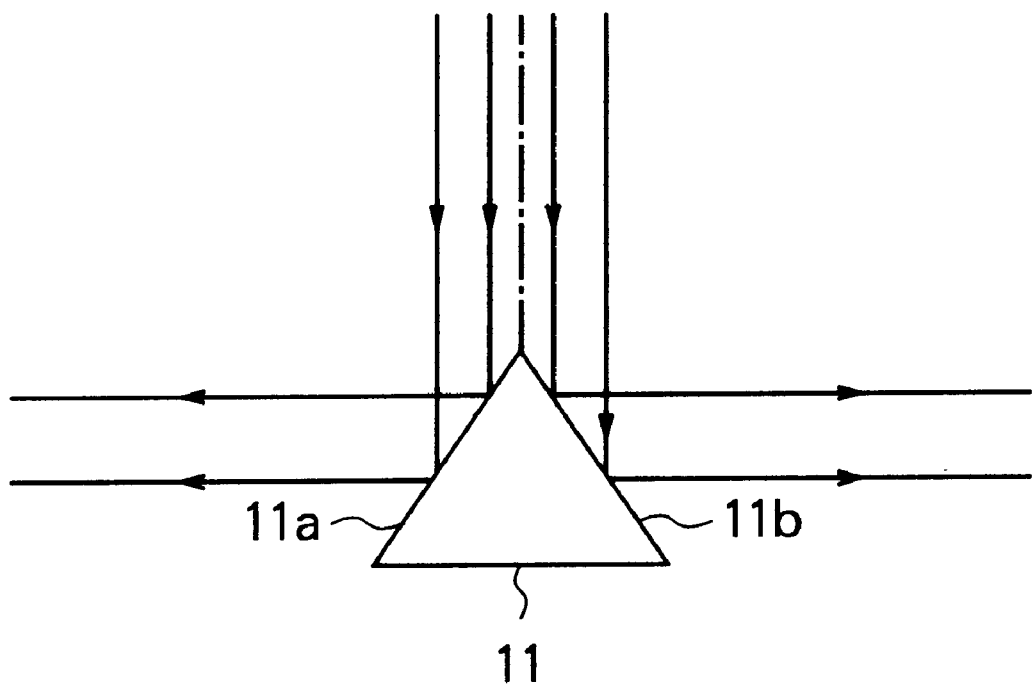
FIG. 2 is an enlarged view for describing the function of a 45° reflection mirror illustrated in FIG. 1 as a beam splitter.
Figure 3:
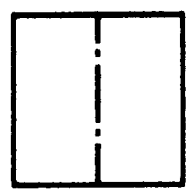
FIG. 3 is a view for describing a cross section of a laser beam.

Referring to FIG. 2, the reflection mirror 11 has two reflecting surfaces 11a and 11b intersecting each other at an angle 90°. The laser beam is incident to the reflection mirror 11a in such a manner that an incidence area on the reflecting surface 11a is equal to that on the reflecting surface 11b. As a result, the reflection mirror 11 divides the laser beam incident thereto equally in its sectional area. For example, the laser beam having a square section of 12×12 (mm) is equally divided into the two split laser beams each of which has a rectangular section of 6×12 (mm), as illustrated in FIG. 3. Each of the masks 13a and 13b reduces each split laser beam through the aperture having a diameter which is determined depending upon a reduction rate M and the diameter of the via hole and which is typically between 1 and 2 mm. The aperture in each of the masks 13a and 13b has a diameter sufficiently smaller than the sectional area of the split laser beam. Therefore, no disadvantage is caused as a result of division of the laser beam into the two split laser beams.

According to the similar principle, the laser beam can be equally divided into three split laser beams by the use of a triangular-pyramid reflection mirror having three reflecting surfaces. Likewise, the laser beam can be split into four split laser beams by the use of a rectangular-pyramid reflection mirror having four reflecting surfaces.

Figure 4:
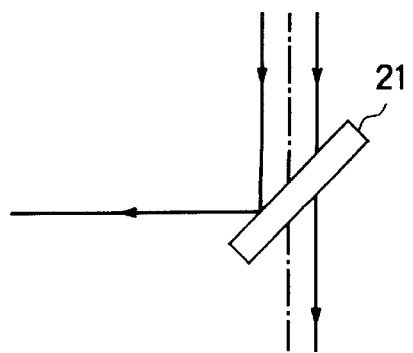
FIG. 4 is a view for describing another beam splitter used instead of the 45° reflection mirror illustrated in FIG. 1.
Figure 5:
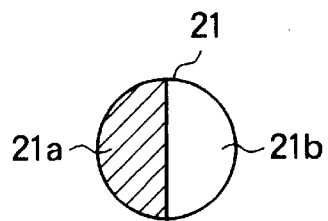
FIG. 5 is a plan view of the beam splitter illustrated in FIG. 4.

Referring to FIGS. 4 and 5, another beam splitter will be described. In the example illustrated in the figure, the beam splitter comprises a 50% reflection mirror 21 for dividing the laser beam into the two split laser beams. As illustrated in FIG. 5, the 50% reflection mirror 21a comprises a reflecting portion 21a and a transparent portion 21b. The reflecting portion 21a occupies a half region of the 50% reflection mirror 21 which region is coated with a reflecting material. Another half region serves as the transparent portion 21b of a total-transmission type. As a result, the laser beam incident to the 50% reflection mirror 21 can be equally divided in its sectional area.

The laser beam may be divided into three in the manner mentioned above. In this case, a 33% reflection mirror is combined with the 50% reflection mirror. The 33% reflection mirror comprises a reflecting portion which occupies a 33% region of the 33% reflection mirror. A remaining region serves as the transparent region. The laser beam transmitted through the transparent region is divided into two laser beams by the use of the 50% reflection mirror.

Figure 6:
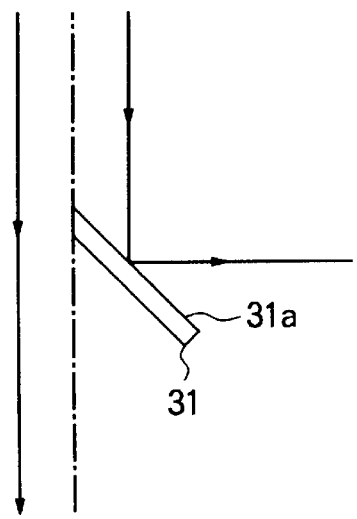
FIG. 6 is a view for describing still another beam splitter used instead of the 45° reflection mirror illustrated in FIG. 1.

FIG. 6 shows still another beam splitter. In the example illustrated in the figure, the beam splitter comprises an edge mirror 31. The edge mirror 31 has a reflecting surface 31a forming an angle 45° with respect to an optical axis of the laser beam. The edge mirror 31 can reflect a half of the laser beam in its sectional area to a direction of 90° with respect the optical axis of the laser beam.

This embodiment is characterized in that the laser beam can be divided by the use of any one of the above-mentioned reflection mirrors without decreasing the energy density of the laser beam.

Figure 7:
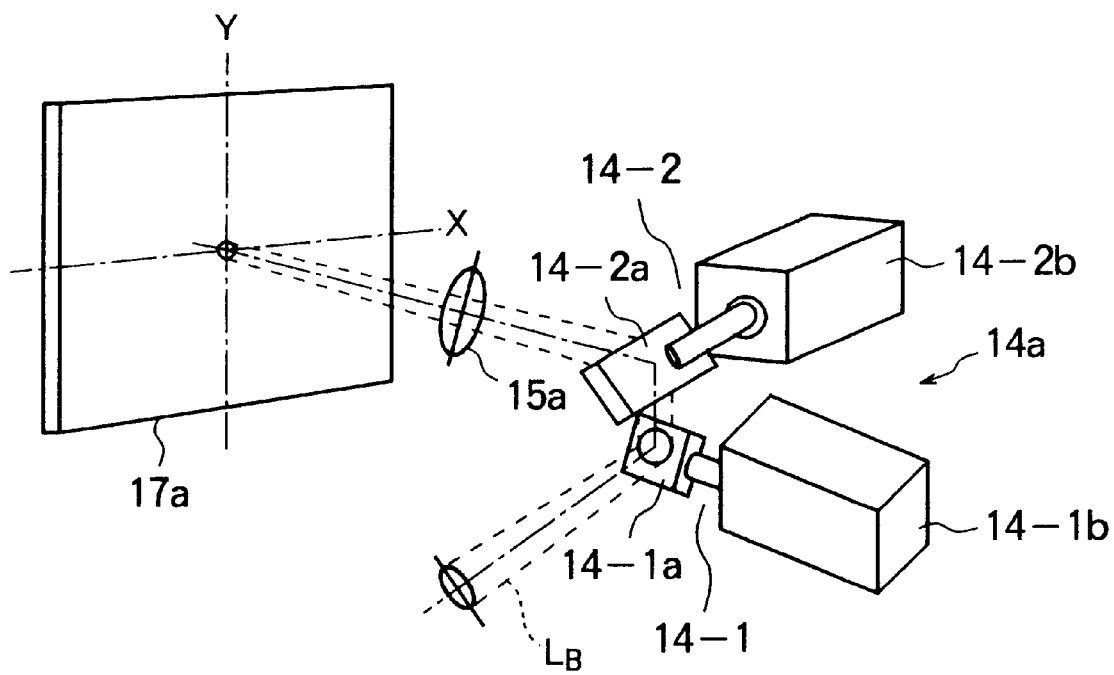
FIG. 7 is a view showing the structure of an X-Y scanner illustrated in FIG. 1.

Referring to FIG. 7, the X-Y scanner 14a will be described. The X-Y scanner 14a is a so-called galvanoscanner comprising a combination of two galvano-mirrors 14-1 and 14-2. As well known, the galvanomirror 14-1 comprises a reflection mirror 14-1a and a drive mechanism 14-1b for rotating the reflection mirror 14-1a. Likewise, the galvanomirror 14-2 comprises a reflection mirror 14-2a and a drive mechanism 14-2b for rotating the reflection mirror 14-2b. The two reflection mirrors 14-1a and 14-2a are independently rotated in accordance with the principle of driving a galvanometer so as to continuously irradiate the split laser beam depicted at $L_B$ to a plurality of desired positions on the workpiece 17a through the processing lens 15a. The X-Y scanner 14b is similar in structure to the X-Y scanner 14a.

Figure 8:
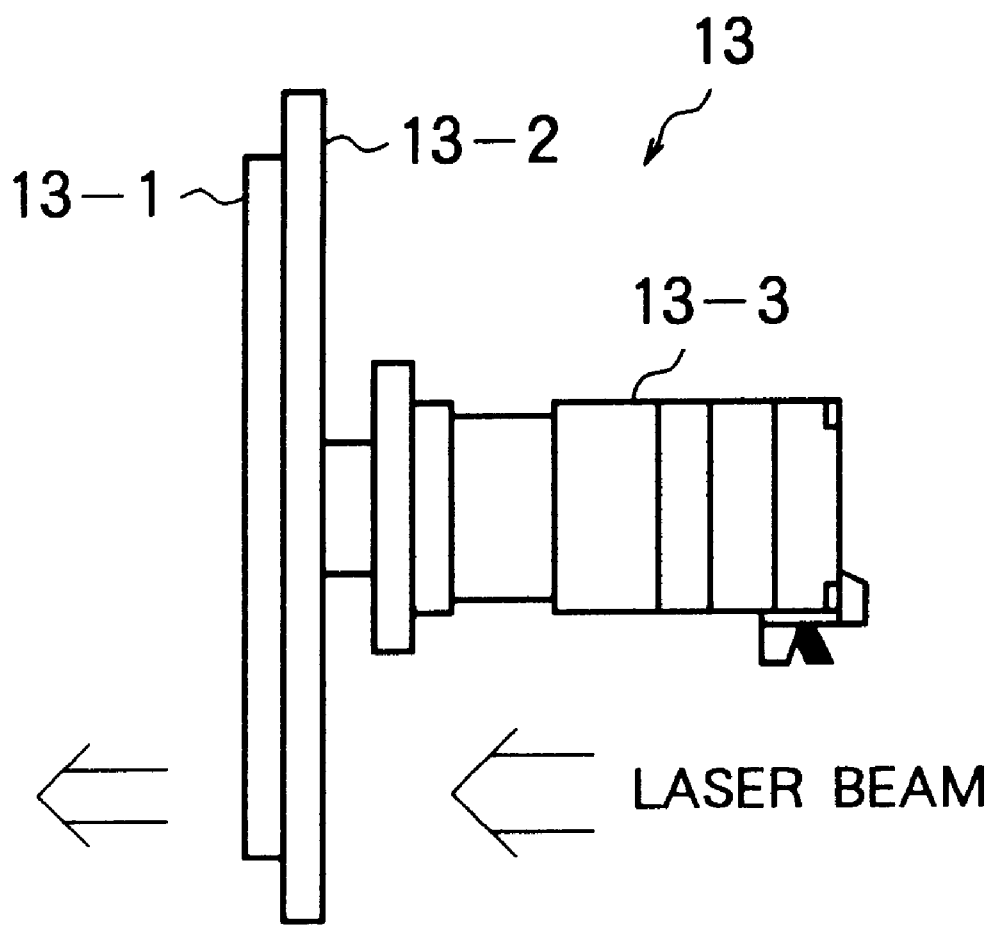
FIG. 8 is a side view showing the structure of a mask illustrated in FIG. 1.
Figure 9:
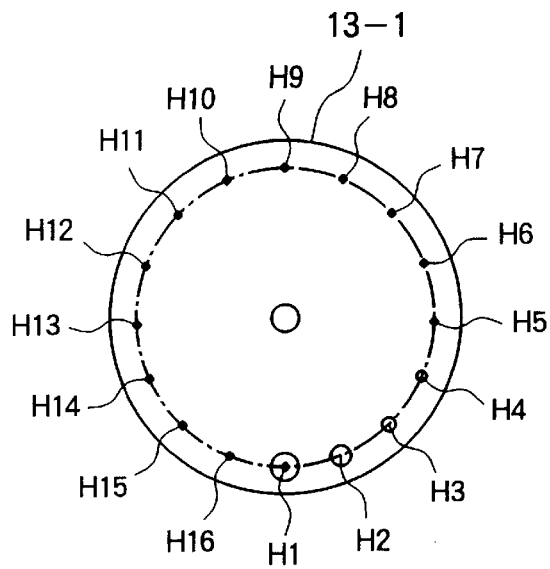
FIG. 9 is a front view showing a mask plate in the mask illustrated in FIG. 8.
Figure 10:
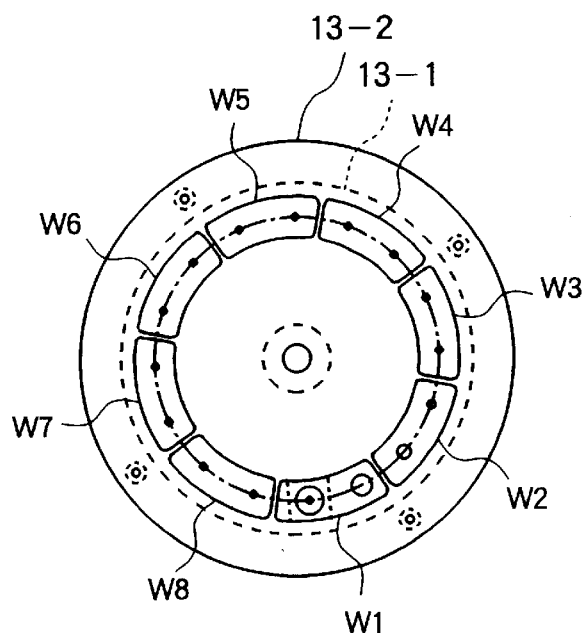
FIG. 10 is a front view showing a mask holder in the mask illustrated in FIG. 8.

Referring to FIGS. 8 through 10, a preferred example of the mask 13 will be described. The mask 13 comprises a disk-shaped mask plate 13-1, a mask holder 13-2, and a drive portion 13-3. The mask plate 13-1 has a plurality of apertures H1 through H16 different in diameter and equiangularly spaced in a circumferential direction. The mask holder 13-2 has an area slightly greater than that of the mask plate 13-1. The mask holder 13-2 serves to hold the mask plate 13-1 and has a plurality of windows W1 through W8 formed in those regions corresponding to the apertures H1 through H16 of the mask plate 13-1. The drive portion 13-3 rotates a combination of the mask plate 13-1 and the mask holder 13-2 integrally coupled to each other.

The mask 13 is positioned so that, when the mask plate 13-1 is rotated, each of the apertures H1 through H16 passes across an optical path of the laser beam. In other words, the mask plate 13-1 has a rotation axis parallel to the optical path of the laser beam. In addition, the optical path of the laser beam is positioned on a virtual circle connecting centers of the apertures H1 through H16 and depicted by a dash-and-dot line in FIG. 9. The mask 13 further comprises a two-axis micromanipulator mechanism for fine adjustment of its position, although not illustrated in the figure. By the two-axis micromanipulator mechanism, the position of either a combination of the mask plate 13-1 and the mask holder 13-2 or a whole of the mask 13 further including the drive portion 13-3 is finely adjusted in parallel to a plane of the mask plate 13-1. As a result, the center positions of the apertures are finely adjusted in correspondence to the optical path of the laser beam.

The mask plate 13-1 is formed by a metal material such as an SUS or copper. In this case, a part of the laser beam incident to the mask plate 13-1 at a region except one aperture is reflected as a reflected laser beam. In order to avoid the influence of the reflected laser beam upon other optical components located within the optical path of the laser beam, irregular reflection is required. Taking this into consideration, the mask plate 13-1 is subjected to surface treatment such as shot basting. The diameters of the apertures in the mask plate 13-1 are designed in accordance with the principle of the mask projection technique. Specifically, the diameters of the apertures are designed so that excellent workability is obtained with respect to resin such as epoxy and PI typically used in a high-density multilayer printed wiring board and that the energy density (fluence) of a working surface is on the order of 10 $J/cm^2$. In this embodiment, the reduction rate (M) is designed to be on the order of 10. In this case, when the aperture H10 of the mask plate 13-1 is selected, the via hole having a diameter of 0.1 mm is formed. The reduction rate (M) can be selected to a desired value by varying the distance between the mask plate 13-1 and the processing lens.

The diameter of the via hole currently used is typically equal to 0.1 mm. In this connection, the apertures H1 through H16 formed in the mask plate 13-1 have diameters most of which are selected within a range between 1 and 2 mm and some of which are slightly greater or smaller than the above-mentioned range. For example, H1: 8 mm, H2: 6 mm, H3: 4 mm, H4: 3 mm, H5: 2 mm, H6: 1.8 mm, H7: 1.6 mm, H8: 1.4 mm, H9: 1.2 mm, H10: 1.0 mm, H11: 0.9 mm, H12: 0.8 mm, H13: 0.7 mm, H14: 0.6 mm, H15: 0.5 mm, and H16: 0.4 mm. These apertures are successively arranged counterclockwise from the greatest.

The drive portion 13-3 rotates the mask plate 13-1 under control of a main control unit which is not illustrated in the figure. Specifically, the main control unit selects a particular one of the apertures corresponding to the diameter of the via hole with reference to drill data set by an operator and master data such as a CAD file, and makes the mask plate 13-1 rotate so that the particular aperture is positioned in the optical path of the laser beam. Generally, the diameter of the via hole is specified by a T code in the drill data. In this embodiment, the mask plate 13-1 is rotated in accordance with the T code so as to select a desired diameter of the via hole.

Turning back to FIG. 1, the X-Y scanners 14a and 14b are preferably located to be symmetrical with respect to the reflection mirror 11. This is because the laser beam has a beam divergence angle. The beam divergence angle is a nature such that a laser beam is increased in diameter with an increase in length of its optical path. With the above-mentioned symmetrical arrangement, the distances from a beam emission port of the laser oscillator 10 to the working surfaces of the workpieces 17a and 17b can easily be rendered equal to each other. As a result, the energy densities of the split laser beams on the working surfaces can be made equal to each other.

At any rate, in this embodiment, the laser beam from the laser oscillator 10 is divided into the two split laser beams without decreasing its energy density to lead the split laser beams to the two laser irradiation units. Then, the two workpieces 17a and 17b are subjected to exactly same boring operations. As a result, the working speed of boring can be doubled. Therefore, the working cost per aperture can considerably be reduced. It is noted here that the X-Y scanners 14a and 14b may scan the workpieces 17a and 17b in same boring patterns or in different boring patterns.

Figure 11:
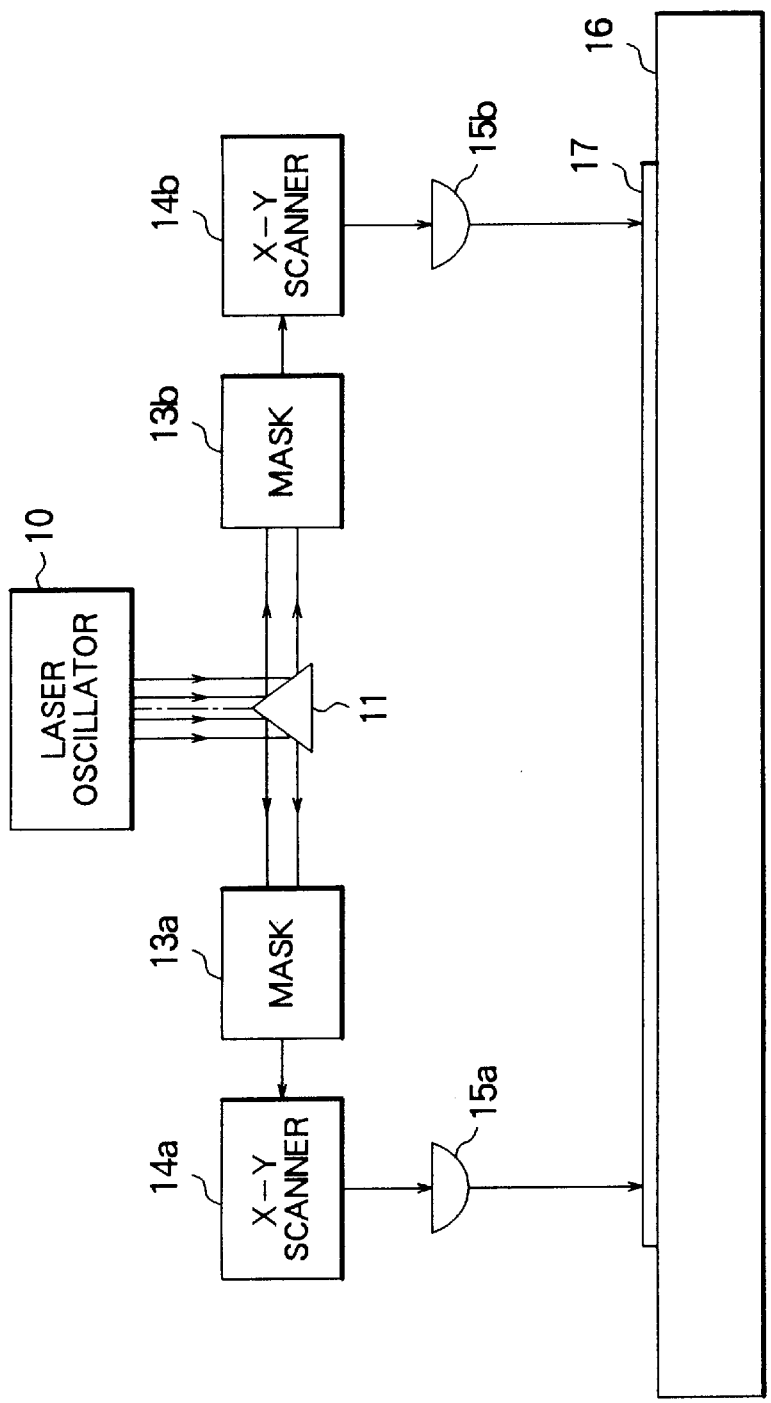
FIG. 11 is a schematic block diagram showing the structure of a laser beam machining apparatus according to a second embodiment of this invention.

Referring to FIG. 11, a laser machining apparatus according to a second embodiment of this invention will be described. The laser machining apparatus in this embodiment is different from the first embodiment in that the apparatus has a single workstage 16. The laser machining apparatus makes the X-Y scanners 14a and 14b simultaneously scan a single workpiece 17 placed on the workstage 16 to perform simultaneous boring operations. For convenience of illustration, the X-Y scanners 14a and 14b scan both peripheral sides of the workpiece 17 in the figure. However, the X-Y scanners 14a and 14b can be disposed adjacent to each other. It will therefore be understood that adjacent regions of the workpiece 17 can be simultaneously scanned for boring. Again, the X-Y scanners 14a and 14b may scan the workpiece 17 in same boring patterns or in different boring patterns.

Figure 12:
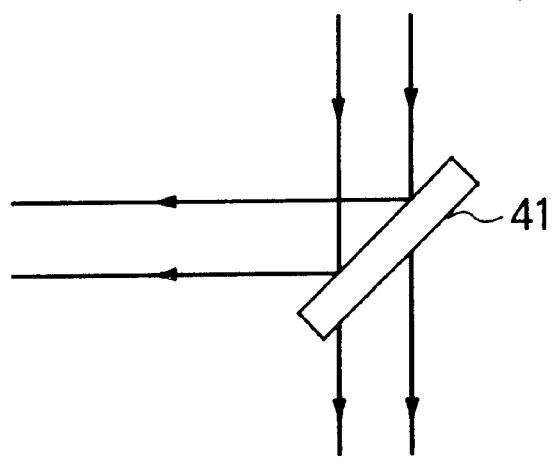
FIG. 12 is a view for describing yet another beam splitter used instead of the 45° reflection mirror illustrated in FIG. 1.

Referring to FIG. 12, the beam splitter may be implemented by an energy split type. A beam splitter 41 is of a half-split type and comprises a 50% reflecting surface. The 50% reflecting surface reflects a half of the laser beam in energy. Another half of the laser beam in energy is transmitted through the 50% reflecting surface.

This invention is most effective if it is applied to the TEA $CO_2$ laser. However, this invention is also applicable to any existing laser machining apparatus such as a $CO_2$ laser, a YAG laser, and an excimer laser. The laser beam may be a pulse wave or a continuous wave. This invention is particularly adapted to process a printed wiring board or a flexible printed wiring board but is also applicable to any other object such as resin or glass.

As described in the foregoing, the laser beam from one laser oscillator is divided into a plurality of the split laser beams without decreasing the energy density and the split laser beams are led to a plurality of the laser irradiation units. Thus, the laser machining apparatus according to this invention can considerably increase the working speed because the workpiece or workpieces are simultaneously processed with the split laser beams. As a result, the working cost can be considerably reduced.

What is claimed is:

1. A laser machining apparatus comprising a laser oscillator for producing a laser beam, beam splitter means for splitting said laser beam into a plurality of split laser beams, and a plurality of laser irradiating means for irradiating said split laser beams to at least one object to be processed, wherein a plurality of objects are processed by said plurality of split laser beams, respectively, wherein each of said laser irradiating means comprises a galvanoscanner formed by a combination of a plurality of galvanomirrors to scan said object by said split laser beam.

2. A laser machining apparatus as claimed in claim 1, wherein said beam splitter means comprises a half-split reflecting mirror having two reflecting surfaces intersecting each other at an angle of 90°.

3. A laser machining apparatus as claimed in claim 1, wherein said beam splitter means is of a half-split type and comprises a 50% reflecting mirror having a half region as a reflecting surface and the other half region as a transparent surface.

4. A laser machining apparatus as claimed in claim 1, wherein said beam splitter means is of a half-split type and comprises an edge mirror for reflecting a half of said laser beam in its sectional area to a direction at an angle of 90° with respect to an optical axis of said laser beam.

5. A laser machining apparatus as claimed in claim 1, wherein said beam splitter means is of a half-split type and comprises a 50% reflecting surface for reflecting a half of said laser beam in energy and for transmitting another half of said laser beam in energy.

6. A laser machining apparatus as claimed in claim 1, wherein said galvanoscanners, two in number, are arranged at positions symmetrical with respect to said beam splitter means, said apparatus being provided with two workstages for mounting said objects in correspondence to said two galvanoscanners, respectively.

7. A laser machining apparatus as claimed in claim 6, wherein each of said two workstages is driven by a stage drive mechanism to be movable on an X-Y plane.

8. A laser machining apparatus comprising a laser oscillator for producing a laser beam, beam splitter means for splitting said laser beam into a plurality of split laser beams, and a plurality of laser irradiating means for irradiating said split laser beams to at least one object to be processed, wherein a single object is processed simultaneously by said plurality of split leaser beams and each of said laser irradiating means comprises a galvanoscanner formed by a combination of a plurality of galvanomirrors to scan said objects by said split laser beam.

9. A laser machining apparatus as claimed in claim 8, -wherein said beam splitter means comprises a half-split reflecting mirror having two reflecting surfaces intersecting each other at an angle of 90°.

10. A laser machining apparatus as claimed in claim 8, wherein said beam splitter means is of a half-split type and comprises a 50% reflecting mirror having a half region as a reflecting surface and the other half region as a transparent surface.

11. A laser machining apparatus as claimed in claim 8, wherein said beam splitter means is of a half-split type and comprises an edge mirror for reflecting a half of said laser beam in its sectional area to a direction at an angle of 90° with respect to an optical axis of said laser beam.

12. A laser machining apparatus as claimed in claim 8, wherein said beam splitter means is of a half-split type and comprises a 50% reflecting surface for reflecting a half of said laser beam in energy and for transmitting another half of said laser beam in energy.

13. A laser machining apparatus as claimed in claim 8, wherein said galvanoscanners, two in number, are arranged at positions symmetrical with respect to said beam splitter means, said apparatus being provided with a single workstage for mounting said object.

14. A laser machining apparatus as claimed in claim 13, wherein said workstage is driven by a stage drive mechanism to be movable on an X-Y plane.

* * * * *